United States Patent
Longman et al.

(10) Patent No.: US 11,719,810 B2
(45) Date of Patent: Aug. 8, 2023

(54) AUTOMOTIVE SYNTHETIC APERTURE RADAR WITH RADON TRANSFORM

(71) Applicant: GM GLOBAL TECHNOLOGY OPERATIONS LLC, Detroit, MI (US)

(72) Inventors: Oren Longman, Tel Aviv (IL); Igal Bilik, Rehovot (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 299 days.

(21) Appl. No.: 17/208,065

(22) Filed: Mar. 22, 2021

(65) Prior Publication Data
US 2022/0299632 A1    Sep. 22, 2022

(51) Int. Cl.
*G01S 13/90* (2006.01)
*G06T 11/00* (2006.01)
*G01S 13/931* (2020.01)

(52) U.S. Cl.
CPC ........ *G01S 13/904* (2019.05); *G01S 13/9029* (2013.01); *G01S 13/9094* (2013.01); *G01S 13/931* (2013.01); *G06T 11/006* (2013.01); G01S 2013/932 (2020.01); G06T 2207/10044 (2013.01)

(58) Field of Classification Search
CPC ............. G01S 13/904; G01S 13/9029; G01S 13/9094; G01S 13/931; G01S 2013/932; G06T 11/006; G06T 2207/10044
USPC ......................................................... 342/25
See application file for complete search history.

(56) References Cited

U.S. PATENT DOCUMENTS

| | | | | |
|---|---|---|---|---|
| 4,034,370 A | * | 7/1977 | Mims .................. | G01S 13/9011 367/12 |
| 4,851,848 A | * | 7/1989 | Wehner ............... | G01S 13/9011 342/201 |
| 5,055,851 A | * | 10/1991 | Sheffer .................. | G08B 25/10 380/58 |
| 5,101,270 A | * | 3/1992 | Boone ................... | G06V 10/88 382/210 |

(Continued)

FOREIGN PATENT DOCUMENTS

| | | | | | |
|---|---|---|---|---|---|
| CN | 114675270 A | * | 6/2022 | ........... | G01S 13/426 |
| GB | 2541658 A | * | 3/2017 | ........... | G01S 13/867 |
| WO | WO-2017032977 A1 | * | 3/2017 | ........... | G01S 13/867 |

*Primary Examiner* — Nuzhat Pervin
(74) *Attorney, Agent, or Firm* — Lorenz & Kopf, LLP

(57) ABSTRACT

A method for using Synthetic Aperture Radar (SAR) to perform a maneuver in a land vehicle is provided. The method includes: receiving digitized radar return data from a radar transmission from a SAR onboard the vehicle; accumulating a plurality of frames of the digitized radar return data; applying a RADON transform to the accumulated plurality of frames of the digitized radar return data and odometry data from the vehicle to generate transformed frames of data for each three-dimensional point, wherein the RADON transform is configured to perform coherent integration for each three-dimensional point, project a radar trajectory onto each three-dimensional point, and project Doppler information onto each three-dimensional point; generating a two-dimensional map of an area covered by the radar transmission from the SAR based on the transformed frames of data for each three-dimensional point; and performing a maneuver with the land vehicle by applying the generated two-dimensional map.

20 Claims, 3 Drawing Sheets

(56) References Cited

U.S. PATENT DOCUMENTS

| | | | | |
|---|---|---|---|---|
| 5,394,151 | A * | 2/1995 | Knaell | G01S 7/4021 |
| | | | | 342/25 F |
| 5,424,742 | A * | 6/1995 | Long | G01S 13/904 |
| | | | | 342/25 C |
| 5,430,445 | A * | 7/1995 | Peregrim | G01S 13/22 |
| | | | | 342/25 C |
| 5,818,383 | A * | 10/1998 | Stockburger | G01S 7/415 |
| | | | | 342/161 |
| 5,838,668 | A * | 11/1998 | Okada | H04L 1/1887 |
| | | | | 455/12.1 |
| 6,400,306 | B1 * | 6/2002 | Nohara | G01S 13/87 |
| | | | | 342/25 R |
| 6,628,844 | B1 * | 9/2003 | Benitz | G01S 13/9011 |
| | | | | 382/280 |
| 8,994,591 | B2 * | 3/2015 | Dupray | H04W 64/00 |
| | | | | 342/465 |
| 9,274,219 | B2 * | 3/2016 | Lamb | G01S 13/904 |
| 9,529,081 | B2 * | 12/2016 | Whelan | G01S 7/414 |
| 10,136,429 | B2 * | 11/2018 | Lee | H04W 52/0241 |
| 10,594,444 | B2 * | 3/2020 | Seo | H04L 1/1864 |
| 2007/0290918 | A1 * | 12/2007 | Filias | G05D 1/0646 |
| | | | | 342/29 |
| 2009/0021423 | A1 * | 1/2009 | Cheng | G01S 13/89 |
| | | | | 342/25 A |
| 2013/0009807 | A1 * | 1/2013 | Lamb | G01S 13/904 |
| | | | | 342/25 B |
| 2015/0042510 | A1 * | 2/2015 | Carande | G01S 13/9023 |
| | | | | 342/25 C |
| 2016/0103216 | A1 * | 4/2016 | Whelan | G01S 13/90 |
| | | | | 342/25 A |
| 2021/0109210 | A1 * | 4/2021 | Kabakian | G01S 13/9004 |
| 2021/0405184 | A1 * | 12/2021 | Schindler | G01S 13/9017 |

* cited by examiner

AUTOMOTIVE SYNTHETIC APERTURE RADAR WITH RADON TRANSFORM

TECHNICAL FIELD

The technology described in this patent document relates generally to systems and methods for using Synthetic Aperture Radar (SAR) in an automotive setting and more particularly to systems and methods for near field use of SAR in an automotive setting.

Radar is useful in many vehicle applications such as collision warning, blind spot warning, lane change assist, parking assist, and rear collision warning. One type of radar used is a pulsed radar. In pulsed radar, the radar sends signals in the form of pulses at fixed intervals. Obstacles scatter the transmitted pulses, and the scattered pulses are received by the radar. The time between sending a pulse and receiving a scattered pulse is proportional to the distance of the obstacle from the radar. Radar angular resolution can be limited by the physical antenna aperture. Radar angular resolution can be improved by creating a larger virtual aperture. By accumulating information from a moving radar, a large virtual aperture can be achieved. Synthetic Aperture Radar (SAR) can enable high angular resolution by creating a large synthetic antenna.

SAR uses pulse compression technology and the principle of synthetic aperture to achieve imaging of ground scenes. SAR is typically used on satellites or aircraft for far field applications such as environmental monitoring, resource exploration, surveying and mapping, and battlefield reconnaissance. The radar returns from SAR are typically processed using some form of a fast Fourier transform (FFT).

Conventional SAR processing requires the radar to travel at a straight path with a constant velocity, assumes far-field operation, and requires the unambiguous synthetic antenna with ½λ spacing, which limits maximal velocity to: v=F·A, where F is the frame rate, A is the antenna aperture and v is the maximal velocity. As an example, for a frame rate of 30 fps and an aperture of 4 cm (20 antennas), the maximal velocity is limited to 1.2 m/s. The automotive environment does not meet these assumptions, limiting the useability of conventional SAR implementations.

Accordingly, it is desirable to provide systems and methods for adapting SAR for near field application in an automotive environment. Furthermore, other desirable features and characteristics will become apparent from the subsequent detailed description and the appended claims, taken in conjunction with the accompanying drawings.

SUMMARY

Systems and methods for adapting SAR for near field application in an automotive environment are provided. In one embodiment, a method for using Synthetic Aperture Radar (SAR) to perform a maneuver in a land vehicle is provided. The method includes: receiving digitized radar return data from a pulsed radar transmission from a SAR onboard the land vehicle; accumulating a plurality of frames of the digitized radar return data; applying a RADON transform to the accumulated plurality of frames of the digitized radar return data and odometry data from the land vehicle to generate transformed frames of data for each three-dimensional (x,y,z) point, wherein the RADON transform is configured to perform coherent integration for each three-dimensional point for which a radar return exists from the pulsed radar transmission, project a radar trajectory onto each three-dimensional point, and project Doppler information onto each three-dimensional point; generating a two-dimensional X-Y map of an area covered by the pulsed radar transmission from the SAR based on the transformed frames of data for each three-dimensional point; and performing an autonomous or semiautonomous maneuver with the land vehicle by applying the generated two-dimensional X-Y map.

In one embodiment, the RADON transform includes a range dimension, a Doppler dimension, and a phase dimension.

In one embodiment, the RADON transform is represented by:

$$S(x, y, z) = \sum_{f=0}^{F-1}\sum_{v=0}^{V-1}\sum_{h=0}^{H-1}\sum_{m=0}^{M-1}\sum_{n=0}^{N-1} s(n, m, h, f)$$

$$e^{-2\pi j R(m,f,x,y,z)\frac{n}{N}} e^{-2\pi j D(m,f,x,y,z)\frac{m}{M}} e^{-2\pi j P(m,h,v,f,x,y,z)}$$

wherein: R(m,f,x,y,z) represents a range dimension, D(m,f,x,y,z) represents a Doppler dimension, P(m,h,f,x,y,z) represents a phase dimension, m=sample index, n=chirp index, h=horizontal antenna index, v=vertical antenna index, f=frame index, x=x-axis location, y=y-axis location, z=z-axis location, s=sampled signal, N=number of samples, M=number of chirps, H=number of horizontal antennas, V=number of vertical antennas, and F=number of frames.

In one embodiment, the range dimension of the RADON transform is represented by:

$$R(m, f, x, y, z) = \frac{2\alpha}{c}\sqrt{(O_x(t(m, f)) - x)^2 + (O_y(t(m, f)) - y)^2 + (O_z(t(m, f)) - z)^2}$$

wherein: c=speed of light, α=chirp slope, t(m,f)=mT$_c$+fT$_f$, T$_c$=Chirp repetition interval, T$_f$=Frame repetition interval, O$_x$=Odometry based vehicle position at the x-axis, O$_y$=Odometry based vehicle position at the y-axis, and O$_z$=Odometry based vehicle position at the z-axis.

In one embodiment, the Doppler dimension of the RADON transform is represented by:

$$D(m, f, x, y, z) = \frac{2}{\lambda} \frac{O_x(t(m, f)) - x)O_{Vx} + (O_y(t(m, f)) - y)O_{Vy} + (O_z(t(m, f)) - z)O_{Vz}}{\sqrt{(O_x(t(m, f)) - x)^2 + (O_y(t(m, f)) - y)^2 + (O_z(t(m, f)) - z)^2}}$$

wherein: t(m,f)=mT$_c$+fT$_f$, λ=signal wavelength, T$_c$=Chirp repetition interval, T$_f$=Frame repetition interval, O$_x$=Odometry based vehicle position at the x-axis, O$_y$=Odometry based vehicle position at the y-axis, O$_z$=Odometry based vehicle position at the z-axis, O$_{Vx}$=Odometry based vehicle velocity at the x-axis, O$_{Vy}$=Odometry based vehicle velocity at the y-axis, and O$_{Vz}$=Odometry based vehicle velocity at the z-axis.

In one embodiment, the phase dimension of the RADON transform is represented by:

$$P(m, h, f, x, y, z) = \frac{\dfrac{O_y(t(m,f))-y}{O_x(t(m,f))-x}}{\sqrt{1+\left(\dfrac{O_y(t(m,f))-y}{O_x(t(m,f))-x}\right)^2}\sqrt{1+\dfrac{(O_z(t(m,f))-z)^2}{(O_x(t(m,f))-x)^2+(O_y(t(m,f))-y)^2}}} h\frac{d_h}{\lambda} +$$

$$\frac{\dfrac{O_z(t(m,f))-z}{\sqrt{(O_x(t(m,f))-x)^2+(O_y(t(m,f))-y)^2}}}{\sqrt{1+\dfrac{(O_z(t(m,f))-z)^2}{(O_x(t(m,f))-x)^2+(O_y(t(m,f))-y)^2}}} v\frac{d_v}{\lambda}$$

wherein: $t(m,f)=mT_c+fT_f$, $\lambda$=signal wavelength, $d_h$=antenna horizontal spacing, $d_v$=antenna vertical spacing, $T_c$=Chirp repetition interval, $T_f$=Frame repetition interval, $O_x$=Odometry based vehicle position at the x-axis, $O_y$=Odometry based vehicle position at the y-axis, $O_z$=Odometry based vehicle position at the z-axis, $O_{Vx}$=Odometry based vehicle velocity at the x-axis, $O_{Vy}$=Odometry based vehicle velocity at the y-axis, and $O_{Vz}$=Odometry based vehicle velocity at the z-axis.

In one embodiment, the RADON transform is represented by:

$$S(x, y, z) = \sum_{f=0}^{F-1}\sum_{v=0}^{V-1}\sum_{h=0}^{H-1}\sum_{m=0}^{M-1}\sum_{n=0}^{N-1} s(n, m, h, f)$$

$$e^{-2\pi jR(m,f,x,y,z)\frac{n}{N}} e^{-2\pi jD(m,f,x,y,z)\frac{m}{M}} e^{-2\pi jP(m,h,v,f,x,y,z)}$$

wherein:

$$R(m, f, x, y, z) = \frac{2\alpha}{c}\sqrt{(O_x(t(m,f))-x)^2+(O_y(t(m,f))-y)^2+(O_z(t(m,f))-z)^2}$$

$$D(m, f, x, y, z) = \frac{2}{\lambda}\frac{O_x(t(m,f))-x)O_{Vx}+(O_y(t(m,f))-y)O_{Vy}+(O_z(t(m,f))-z)O_{Vz}}{\sqrt{(O_x(t(m,f))-x)^2+(O_y(t(m,f))-y)^2+(O_z(t(m,f))-z)^2}}$$

$$P(m, h, f, x, y, z) = \frac{\dfrac{O_y(t(m,f))-y}{O_x(t(m,f))-x}}{\sqrt{1+\left(\dfrac{O_y(t(m,f))-y}{O_x(t(m,f))-x}\right)^2}\sqrt{1+\dfrac{(O_z(t(m,f))-z)^2}{(O_x(t(m,f))-x)^2+(O_y(t(m,f))-y)^2}}} h\frac{d_h}{\lambda} +$$

$$\frac{\dfrac{O_z(t(m,f))-z}{\sqrt{(O_x(t(m,f))-x)^2+(O_y(t(m,f))-y)^2}}}{\sqrt{1+\dfrac{(O_z(t(m,f))-z)^2}{(O_x(t(m,f))-x)^2+(O_y(t(m,f))-y)^2}}} v\frac{d_v}{\lambda}$$

$$t(m, f) = mT_c + fT_f$$

m=sample index, n=chirp index, h=horizontal antenna index, v=vertical antenna index, f=frame index, x=x-axis location, y=y-axis location, z=z-axis location, s=sampled signal, N=number of samples, M=number of chirps, H=number of horizontal antennas, V=number of vertical antennas, F=number of frames, c=speed of light, $\alpha$=chirp slope, $\lambda$=signal wavelength, $d_h$=antenna horizontal spacing, $d_v$=antenna vertical spacing, $T_c$=Chirp repetition interval, $T_f$=Frame repetition interval, $O_x$=Odometry based vehicle position at the x-axis, $O_y$=Odometry based vehicle position at the y-axis, $O_z$=Odometry based vehicle position at the z-axis, $O_{Vx}$=Odometry based vehicle velocity at the x-axis, $O_{Vy}$=Odometry based vehicle velocity at the y-axis, and $O_{Vz}$=Odometry based vehicle velocity at the z-axis.

In another embodiment, a system for applying Synthetic Aperture Radar (SAR) in a land vehicle to perform a maneuver is provided. The system includes a controller configured to: receive digitized radar return data from a pulsed radar transmission from a Synthetic Aperture Radar (SAR) onboard a land vehicle; accumulate a plurality of frames of the digitized radar return data; apply a RADON transform to the accumulated plurality of frames of the digitized radar return data and odometry data from the land vehicle to generate transformed frames of data for each three-dimensional (x,y,z) point, wherein the RADON transform is configured to perform coherent integration for each three-dimensional point for which a radar return exists from the pulsed radar transmission, project a radar trajectory onto each three-dimensional point, and project Doppler information onto each three-dimensional point; generate a two-dimensional X-Y map of an area covered by the pulsed radar transmission from the SAR based on the transformed frames of data for each three-dimensional point; and perform an autonomous or semiautonomous maneuver with the land vehicle by applying the generated two-dimensional X-Y map.

In one embodiment, the RADON transform includes a range dimension, a Doppler dimension, and a phase dimension.

In one embodiment, the RADON transform is represented by:

$$S(x, y, z) = \sum_{f=0}^{F-1}\sum_{v=0}^{V-1}\sum_{h=0}^{H-1}\sum_{m=0}^{M-1}\sum_{n=0}^{N-1} s(n, m, h, f)$$

$$e^{-2\pi jR(m,f,x,y,z)\frac{n}{N}} e^{-2\pi jD(m,f,x,y,z)\frac{m}{M}} e^{-2\pi jP(m,h,v,f,x,y,z)}$$

wherein: R(m,f,x,y,z) represents a range dimension, D(m,f,x,y,z) represents a Doppler dimension, P(m,h,f,x,y,z) represents a phase dimension, m=sample index, n=chirp index, h=horizontal antenna index, v=vertical antenna index, f=frame index, x=x-axis location, y=y-axis location, z=z-axis location, s=sampled signal, N=number of samples, M=number of chirps, H=number of horizontal antennas, V=number of vertical antennas, and F=number of frames.

In one embodiment, the range dimension of the RADON transform is represented by:

$$R(m, f, x, y, z) =$$

$$\frac{2\alpha}{c}\sqrt{(O_x(t(m,f))-x)^2+(O_y(t(m,f))-y)^2+(O_z(t(m,f))-z)^2}$$

wherein: c=speed of light, α=chirp slope, t(m,f)=mT$_c$+fT$_f$, T$_c$=Chirp repetition interval, T$_f$=Frame repetition interval, O$_x$=Odometry based vehicle position at the x-axis, O$_y$=Odometry based vehicle position at the y-axis, and O$_z$=Odometry based vehicle position at the z-axis.

In one embodiment, the Doppler dimension of the RADON transform is represented by:

$$D(m, f, x, y, z) = \frac{2}{\lambda} \frac{\begin{array}{c} O_x(t(m,f)) - x)O_{Vx} + \\ (O_y(t(m,f)) - y)O_{Vy} + (O_z(t(m,f)) - z)O_{Vz} \end{array}}{\sqrt{(O_x(t(m,f)) - x)^2 + (O_y(t(m,f)) - y)^2 + (O_z(t(m,f)) - z)^2}}$$

wherein: t(m,f)=mT$_c$+fT$_f$, λ=signal wavelength, T$_c$=Chirp repetition interval, T$_f$=Frame repetition interval, O$_x$=Odometry based vehicle position at the x-axis, O$_y$=Odometry based vehicle position at the y-axis, O$_z$=Odometry based vehicle position at the z-axis, O$_{Vx}$=Odometry based vehicle velocity at the x-axis, O$_{Vy}$=Odometry based vehicle velocity at the y-axis, and O$_{Vz}$=Odometry based vehicle velocity at the z-axis.

In one embodiment, the phase dimension of the RADON transform is represented by:

$$P(m, h, f, x, y, z) = \frac{\frac{O_y(t(m,f)) - y}{O_x(t(m,f)) - x}}{\sqrt{1 + \left(\frac{O_y(t(m,f)) - y}{O_x(t(m,f)) - x}\right)^2}} h \frac{d_h}{\lambda} + \frac{\frac{O_z(t(m,f)) - z}{\sqrt{(O_x(t(m,f)) - x)^2 + (O_y(t(m,f)) - y)^2}}}{\sqrt{1 + \frac{(O_z(t(mf)) - z)^2}{(O_x(t(m,f)) - x)^2 + (O_y(t(m,f)) - y)^2}}} v \frac{d_v}{\lambda}$$

wherein: t(m,f)=mT$_c$+fT$_f$, λ=signal wavelength, d$_h$=antenna horizontal spacing, d$_v$=antenna vertical spacing, T$_c$=Chirp repetition interval, T$_f$=Frame repetition interval, O$_x$=Odometry based vehicle position at the x-axis, O$_y$=Odometry based vehicle position at the y-axis, O$_z$=Odometry based vehicle position at the z-axis, O$_{Vx}$=Odometry based vehicle velocity at the x-axis, O$_{Vy}$=Odometry based vehicle velocity at the y-axis, and O$_{Vz}$=Odometry based vehicle velocity at the z-axis.

In one embodiment, the RADON transform is represented by:

$$S(x, y, z) = \sum_{f=0}^{F-1} \sum_{v=0}^{V-1} \sum_{h=0}^{H-1} \sum_{m=0}^{M-1} \sum_{n=0}^{N-1} s(n, m, h, f)$$

$$e^{-2\pi j R(m,f,x,y,z)\frac{n}{N}} e^{-2\pi j D(m,f,x,y,z)\frac{m}{M}} e^{-2\pi j P(m,h,v,f,x,y,z)}$$

wherein:

$$R(m, f, x, y, z) = \frac{2\alpha}{c} \sqrt{(O_x(t(m,f)) - x)^2 + (O_y(t(m,f)) - y)^2 + (O_z(t(m,f)) - z)^2}$$

$$D(m, f, x, y, z) = \frac{2}{\lambda} \frac{\begin{array}{c} O_x(t(m,f)) - x)O_{Vx} + \\ (O_y(t(m,f)) - y)O_{Vy} + (O_z(t(m,f)) - z)O_{Vz} \end{array}}{\sqrt{(O_x(t(m,f)) - x)^2 + (O_y(t(m,f)) - y)^2 + (O_z(t(m,f)) - z)^2}}$$

$$P(m, h, f, x, y, z) = \frac{\frac{O_y(t(m,f)) - y}{O_x(t(m,f)) - x}}{\sqrt{1 + \left(\frac{O_y(t(m,f)) - y}{O_x(t(m,f)) - x}\right)^2}} h \frac{d_h}{\lambda} + \frac{\frac{O_z(t(m,f)) - z}{\sqrt{(O_x(t(m,f)) - x)^2 + (O_y(t(m,f)) - y)^2}}}{\sqrt{1 + \frac{(O_z(t(m,f)) - z)^2}{(O_x(t(m,f)) - x)^2 + (O_y(t(m,f)) - y)^2}}} v \frac{d_v}{\lambda}$$

$$t(m, f) = mT_c + fT_f$$

m=sample index, n=chirp index, h=horizontal antenna index, v=vertical antenna index, f=frame index, x=x-axis location, y=y-axis location, z=z-axis location, s=sampled signal, N=number of samples, M=number of chirps, H=number of horizontal antennas, V=number of vertical antennas, F=number of frames, c=speed of light, α=chirp slope, λ=signal wavelength, d$_h$=antenna horizontal spacing, d$_v$=antenna vertical spacing, T$_c$=Chirp repetition interval, T$_f$=Frame repetition interval, O$_x$=Odometry based vehicle position at the x-axis, O$_y$=Odometry based vehicle position at the y-axis, O$_z$=Odometry based vehicle position at the z-axis, O$_{Vx}$=Odometry based vehicle velocity at the x-axis, O$_{Vy}$=Odometry based vehicle velocity at the y-axis, and O$_{Vz}$=Odometry based vehicle velocity at the z-axis.

In another embodiment, a non-transitory computer readable media encoded with programming instructions configurable to cause a processor in a land vehicle to perform a method for using Synthetic Aperture Radar (SAR) to perform a maneuver with the land vehicle. The method includes: accumulating a plurality of frames of the digitized radar return data; applying a RADON transform to the accumulated plurality of frames of the digitized radar return data and odometry data from the land vehicle to generate transformed frames of data for each three-dimensional (x,y,z) point, wherein the RADON transform is configured to perform coherent integration for each three-dimensional point for which a radar return exists from the pulsed radar transmission, project a radar trajectory onto each three-dimensional point, and project Doppler information onto each three-dimensional point; generating a two-dimensional X-Y map of an area covered by the pulsed radar transmission from the SAR based on the transformed frames of data for each three-dimensional point; and performing an autonomous or semiautonomous maneuver with the land vehicle by applying the generated two-dimensional X-Y map.

In one embodiment, the RADON transform includes a range dimension, a Doppler dimension, and a phase dimension.

In one embodiment, the RADON transform is represented by:

$$S(x, y, z) = \sum_{f=0}^{F-1}\sum_{v=0}^{V-1}\sum_{h=0}^{H-1}\sum_{m=0}^{M-1}\sum_{n=0}^{N-1} s(n, m, h, f)$$

$$e^{-2\pi j R(m,f,x,y,z)\frac{n}{N}} e^{-2\pi j D(m,f,x,y,z)\frac{m}{M}} e^{-2\pi j P(m,h,v,f,x,y,z)}$$

wherein: $R(m,f,x,y,z)$ represents a range dimension, $D(m,f,x,y,z)$ represents a Doppler dimension, $P(m,h,f,x,y,z)$ represents a phase dimension, m=sample index, n=chirp index, h=horizontal antenna index, v=vertical antenna index, f=frame index, x=x-axis location, y=y-axis location, z=z-axis location, s=sampled signal, N=number of samples, M=number of chirps, H=number of horizontal antennas, V=number of vertical antennas, and F=number of frames.

In one embodiment, the range dimension of the RADON transform is represented by:

$$R(m, f, x, y, z) = \frac{2\alpha}{c}\sqrt{(O_x(t(m,f)) - x)^2 + (O_y(t(m,f)) - y)^2 + (O_z(t(m,f)) - z)^2}$$

wherein: c=speed of light, $\alpha$=chirp slope, $t(m,f)=mT_c+fT_f$, $T_c$=Chirp repetition interval, $T_f$=Frame repetition interval, $O_x$=Odometry based vehicle position at the x-axis, $O_y$=Odometry based vehicle position at the y-axis, and $O_z$=Odometry based vehicle position at the z-axis.

In one embodiment, the Doppler dimension of the RADON transform is represented by:

$$D(m, f, x, y, z) = \frac{2}{\lambda}\frac{O_x(t(m,f)) - x)O_{Vx} + (O_y(t(m,f)) - y)O_{Vy} + (O_z(t(m,f)) - z)O_{Vz}}{\sqrt{(O_x(t(m,f)) - x)^2 + (O_y(t(m,f)) - y)^2 + (O_z(t(m,f)) - z)^2}}$$

wherein: $t(m,f)=mT_c+fT_f$, $\lambda$=signal wavelength, $T_c$=Chirp repetition interval, $T_f$=Frame repetition interval, $O_x$=Odometry based vehicle position at the x-axis, $O_y$=Odometry based vehicle position at the y-axis, $O_z$=Odometry based vehicle position at the z-axis, $O_{Vx}$=Odometry based vehicle velocity at the x-axis, $O_{Vy}$=Odometry based vehicle velocity at the y-axis, and $O_{Vz}$=Odometry based vehicle velocity at the z-axis.

In one embodiment, the phase dimension of the RADON transform is represented by:

$$P(m, h, f, x, y, z) = \frac{\frac{O_y(t(m,f)) - y}{O_x(t(m,f)) - x}}{\sqrt{1 + \left(\frac{O_y(t(m,f)) - y}{O_x(t(m,f)) - x}\right)^2}} \cdot \frac{1}{\sqrt{1 + \frac{(O_z(t(m,f)) - z)^2}{(O_x(t(m,f)) - x)^2 + (O_y(t(m,f)) - y)^2}}} h\frac{d_h}{\lambda} +$$

$$\frac{\frac{O_z(t(m,f)) - z}{\sqrt{(O_x(t(m,f)) - x)^2 + (O_y(t(m,f)) - y)^2}}}{\sqrt{1 + \frac{(O_z(t(mf)) - z)^2}{(O_x(t(m,f)) - x)^2 + (O_y(t(m,f)) - y)^2}}} v\frac{d_v}{\lambda}$$

wherein: $t(m,f)=mT_c+fT_f$, $\lambda$=signal wavelength, $d_h$=antenna horizontal spacing, $d_v$=antenna vertical spacing, $T_c$=Chirp repetition interval, $T_f$=Frame repetition interval, $O_x$=Odometry based vehicle position at the x-axis, $O_y$=Odometry based vehicle position at the y-axis, $O_z$=Odometry based vehicle position at the z-axis, $O_{Vx}$=Odometry based vehicle velocity at the x-axis, $O_{Vy}$=Odometry based vehicle velocity at the y-axis, and $O_{Vz}$=Odometry based vehicle velocity at the z-axis.

In one embodiment, the RADON transform is represented by:

$$S(x, y, z) = \sum_{f=0}^{F-1}\sum_{v=0}^{V-1}\sum_{h=0}^{H-1}\sum_{m=0}^{M-1}\sum_{n=0}^{N-1} s(n, m, h, f)$$

$$e^{-2\pi j R(m,f,x,y,z)\frac{n}{N}} e^{-2\pi j D(m,f,x,y,z)\frac{m}{M}} e^{-2\pi j P(m,h,v,f,x,y,z)}$$

wherein:

$$R(m, f, x, y, z) = \frac{2\alpha}{c}\sqrt{(O_x(t(m,f)) - x)^2 + (O_y(t(m,f)) - y)^2 + (O_z(t(m,f)) - z)^2}$$

$$D(m, f, x, y, z) = \frac{2}{\lambda}\frac{O_x(t(m,f)) - x)O_{Vx} + (O_y(t(m,f)) - y)O_{Vy} + (O_z(t(m,f)) - z)O_{Vz}}{\sqrt{(O_x(t(m,f)) - x)^2 + (O_y(t(m,f)) - y)^2 + (O_z(t(m,f)) - z)^2}}$$

$$P(m, h, f, x, y, z) = \frac{\frac{O_y(t(m,f)) - y}{O_x(t(m,f)) - x}}{\sqrt{1 + \left(\frac{O_y(t(m,f)) - y}{O_x(t(m,f)) - x}\right)^2}} \cdot \frac{1}{\sqrt{1 + \frac{(O_z(t(m,f)) - z)^2}{(O_x(t(m,f)) - x)^2 + (O_y(t(m,f)) - y)^2}}} h\frac{d_h}{\lambda} +$$

$$\frac{\frac{O_z(t(m,f)) - z}{\sqrt{(O_x(t(m,f)) - x)^2 + (O_y(t(m,f)) - y)^2}}}{\sqrt{1 + \frac{(O_z(t(m,f)) - z)^2}{(O_x(t(m,f)) - x)^2 + (O_y(t(m,f)) - y)^2}}} v\frac{d_v}{\lambda}$$

$$t(m, f) = mT_c + fT_f$$

m=sample index, n=chirp index, h=horizontal antenna index, v=vertical antenna index, f=frame index, x=x-axis location, y=y-axis location, z=z-axis location, s=sampled signal, N=number of samples, M=number of chirps, H=number of horizontal antennas, V=number of vertical antennas, F=number of frames, c=speed of light, $\alpha$=chirp slope, $\lambda$=signal wavelength, $d_h$=antenna horizontal spacing, $d_v$=antenna vertical spacing, $T_c$=Chirp repetition interval, $T_f$=Frame repetition interval, $O_x$=Odometry based vehicle position at the x-axis, $O_y$=Odometry based vehicle position at the y-axis, $O_z$=Odometry based vehicle position at the z-axis, $O_{Vx}$=Odometry based vehicle velocity at the x-axis, $O_{Vy}$=Odometry based vehicle velocity at the y-axis, and
$O_{Vz}$=Odometry based vehicle velocity at the z-axis.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
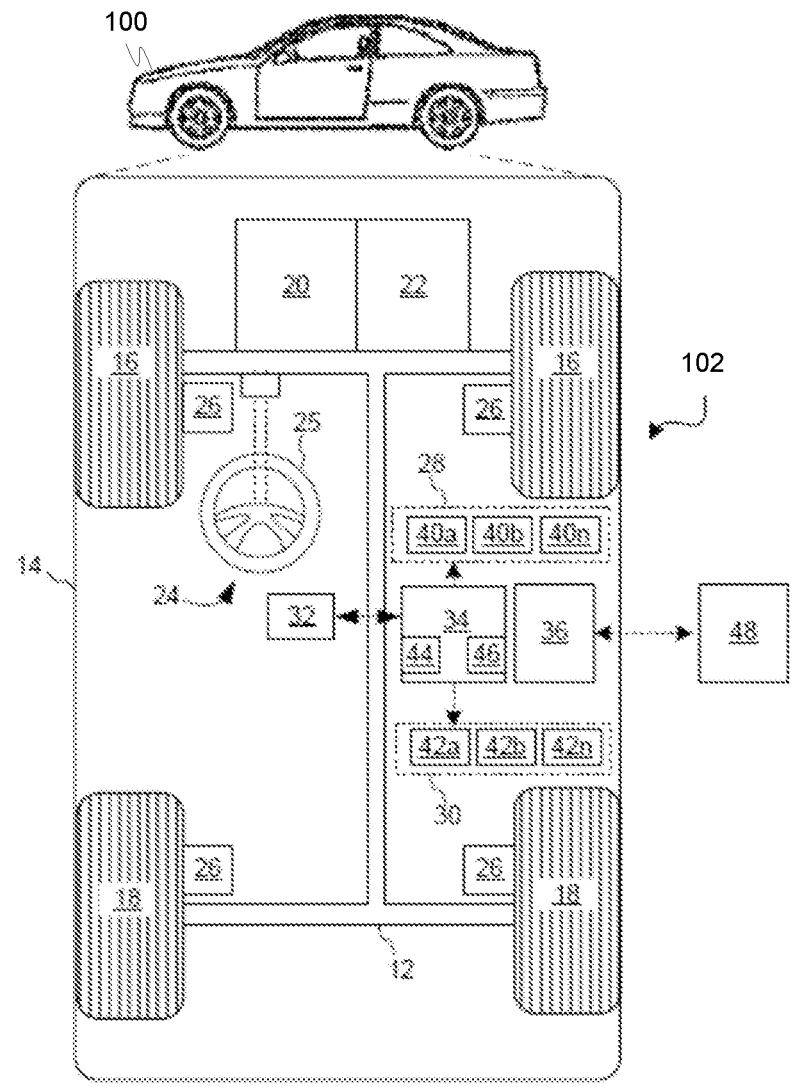
FIG. 1 is a block diagram of an example vehicle that implements Synthetic Aperture Radar, in accordance with various embodiments.

The following detailed description is merely exemplary in nature and is not intended to limit the application and uses. Furthermore, there is no intention to be bound by any expressed or implied theory presented in the preceding technical field, background, summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, machine learning models, radar, lidar, image analysis, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

The subject matter described herein discloses apparatus, systems, techniques, and articles for adapting SAR for near field application in an automotive environment. The following disclosure provides example systems and methods for applying a novel SAR processing approach using a Radon transform. The described subject matter discloses apparatus, systems, techniques, and articles for accumulating multiple radar frames from a moving vehicle and projecting the gathered information according to the vehicle path to estimate the environment. In the described subject matter, a novel Radon-SAR transform is performed on the accumulated data, coherently integrating multiple frames to generate high resolution detection.

In the described subject matter, in addition to the large spatial aperture generated from the vehicle movement, localization accuracy is increased by exploiting Doppler information. In the described subject matter, the Doppler information reduces angular ambiguity, lowering the FPS requirement. The described apparatus, systems, techniques, and articles adapt SAR for near field application by taking the vehicle trajectory into account. In the described subject matter, the adaptation to near field application is accomplished by projecting the vehicle path to each position independently and calculating the Radon-SAR transform for each projection. In the described subject matter, the near field environment increases accuracy and reduces ambiguity due to the multiple observation projections. The described apparatus, systems, techniques, and articles can provide a two-dimensional X-Y map resulting from the described process.

FIG. 1 depicts an example vehicle 100 that includes a SAR module 102 for using Synthetic Aperture Radar (SAR) to assist the vehicle with performing a maneuver. As depicted in FIG. 1, the vehicle 100 generally includes a chassis 12, a body 14, front wheels 16, and rear wheels 18. The body 14 is arranged on the chassis 12 and substantially encloses components of the vehicle 100. The body 14 and the chassis 12 may jointly form a frame. The wheels 16-18 are each rotationally coupled to the chassis 12 near a respective corner of the body 14.

In various embodiments, the vehicle 100 may be an autonomous vehicle or a semi-autonomous vehicle. An autonomous vehicle 100 is, for example, a vehicle that is automatically controlled to carry passengers from one location to another. The vehicle 100 is depicted in the illustrated embodiment as a passenger car, but other vehicle types, including motorcycles, trucks, sport utility vehicles (SUVs), recreational vehicles (RVs), marine vessels, aircraft, etc., may also be used.

As shown, the vehicle 100 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16 and 18 according to selectable speed ratios. According to various embodiments, the transmission system 22 may include a step-ratio automatic transmission, a continuously-variable transmission, or other appropriate transmission.

The brake system 26 is configured to provide braking torque to the vehicle wheels 16 and 18. Brake system 26 may, in various embodiments, include friction brakes, brake by wire, a regenerative braking system such as an electric machine, and/or other appropriate braking systems.

The steering system 24 influences a position of the vehicle wheels 16 and/or 18. While depicted as including a steering wheel 25 for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the vehicle 100 (such as the state of one or more occupants) and generate sensor data relating thereto. Sensing devices 40a-40n might include, but are not limited to, radars (e.g., long-range, medium-range-short range, SAR), lidars, global positioning systems, optical cameras (e.g., forward facing, 360-degree, rear-facing, side-facing, stereo, etc.), thermal (e.g., infrared) cameras, ultrasonic sensors, odometry sensors (e.g., encoders) and/or other sensors that might be utilized in connection with systems and methods in accordance with the present subject matter.

The actuator system 30 includes one or more actuator devices 42a-42n that control one or more vehicle features such as, but not limited to, the propulsion system 20, the transmission system 22, the steering system 24, and the brake system 26. In various embodiments, vehicle 100 may also include interior and/or exterior vehicle features not illustrated in FIG. 1, such as various doors, a trunk, and cabin features such as air, music, lighting, touch-screen display components (such as those used in connection with navigation systems), and the like.

The data storage device 32 stores data for use in automatically controlling the vehicle 100. The data storage device 32 may be part of the controller 34, separate from the controller 34, or part of the controller 34 and part of a separate system. In various embodiments, controller 34 implements a SAR module 102 that is configured to implement SAR processing.

The controller 34 includes at least one processor 44 and a computer-readable storage device or media 46. The processor 44 may be any custom-made or commercially available processor, a central processing unit (CPU), a graphics processing unit (GPU), an application specific integrated circuit (ASIC) (e.g., a custom ASIC implementing a neural network), a field programmable gate array (FPGA), an auxiliary processor among several processors associated with the controller 34, a semiconductor-based microprocessor (in the form of a microchip or chip set), any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or nonvolatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 100.

The instructions may include one or more separate programs, each of which comprises an ordered listing of executable instructions for implementing logical functions. The instructions, when executed by the processor 44, receive and process signals (e.g., sensor data) from the sensor system 28, perform logic, calculations, methods and/or algorithms for automatically controlling the components of the vehicle 100, and generate control signals that are transmitted to the actuator system 30 to automatically control the components of the vehicle 100 based on the logic, calculations, methods, and/or algorithms. Although only one controller 34 is shown in FIG. 1, embodiments of the vehicle 100 may include any number of controllers 34 that communicate over any suitable communication medium or a combination of communication mediums and that cooperate to process the sensor signals, perform logic, calculations, methods, and/or algorithms, and generate control signals to automatically control features of the vehicle 100.

Figure 2:
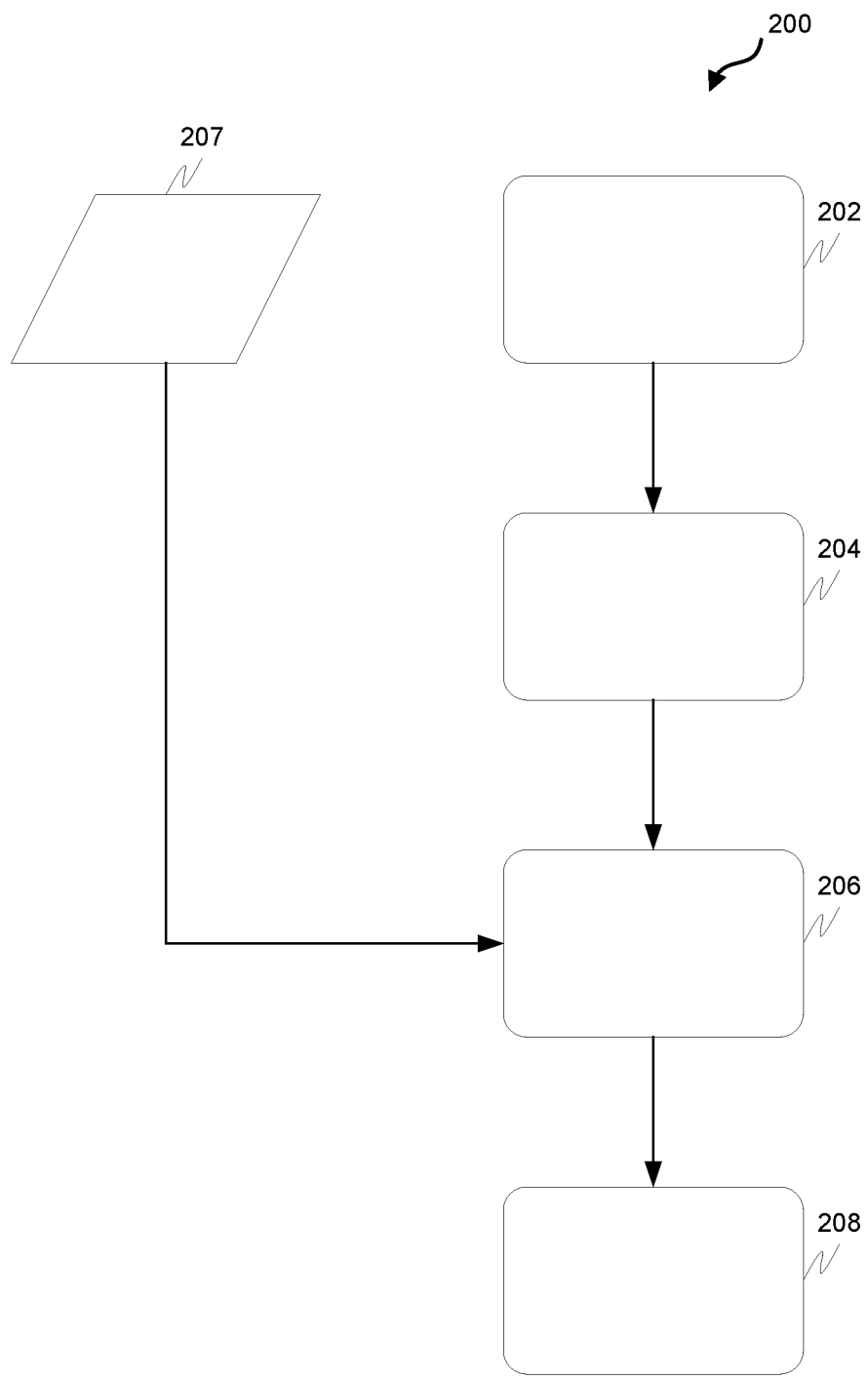
FIG. 2 is a process flow chart depicting an example process for processing radar returns from a SAR implemented on a vehicle to generate a map for use by the vehicle, in accordance with various embodiments.

FIG. 2 is a process flow chart depicting an example process 200 for processing radar returns (e.g., by SAR module 102 implemented by controller 34) from a SAR (e.g., from a sensor system 28 that includes one or more sensing devices 40a-40n that implements SAR) implemented on a vehicle (e.g., vehicle 100) to generate a map for use by the vehicle. The order of operation within process 200 is not limited to the sequential execution as illustrated in the FIG. 2 but may be performed in one or more varying orders as applicable and in accordance with the present disclosure.

The example process 200 includes performing analog to digital conversion (ADC) on radar returns from a SAR in the vehicle (operation 302) to produce a frame of digital data for each converted radar return. The ADC may be performed using conventional methods used in radar systems in a vehicle.

The example process 200 includes accumulating multiple frames of the digitized data (operation 204). Each frame may include radar data from the return for a specific three-dimensional location identified by x,y,z coordinates (hereinafter referred to as (x,y,z) location) gathered from a pulsed transmission. The x,y,z coordinates are based on a coordinate system with an x-axis direction in the direction of vehicle travel, a y-axis direction that is 90 degrees to the left of the x-axis, and a z-axis direction that is 90 degrees in a vertical direction to vehicle travel. The multiple frames may include all or almost all the frames of data gathered from a pulsed transmission.

The example process 200 includes processing the accumulated frames of the digitized data using a RADON-SAR transform (operation 206) and vehicle odometry data 207. The vehicle odometry data may include vehicle position and velocity data. The RADON-SAR transform is a type of Radon transform that has been specially adapted for use with SAR. The RADON-SAR transform is configured to perform coherent integration for every (x,y,z) point (e.g., (x,y,z) location for which a radar return exists from the pulsed transmission). The RADON-SAR transform is configured to account for a radar trajectory, according to the vehicle path, by projecting the radar trajectory onto each three-dimensional (x,y,z) point and coherently integrate the accumulated frames. This allows the SAR to support arbitrary radar trajectory, in addition to straight line trajectory with a constant velocity. The RADON-SAR transform is configured to account for Doppler information to increase accuracy and reduce ambiguity. The RADON-SAR transform includes a range dimension, a Doppler dimension, and a phase dimension. This configures the RADON-SAR transform to support range, Doppler, and spatial migration within frames and between of frames, caused from radar movement. The example RADON-SAR transform assumes static objects. The coherent integration performed in the RADON-SAR transform increase target signal-to-noise-ratio (SNR).

An example RADON-SAR transform is represented by:

$$S(x, y, z) = \sum_{f=0}^{F-1}\sum_{v=0}^{V-1}\sum_{h=0}^{H-1}\sum_{m=0}^{M-1}\sum_{n=0}^{N-1} s(n, m, h, f)$$

$$e^{-2\pi j R(m,f,x,y,z)\frac{n}{N}} e^{-2\pi j D(m,f,x,y,z)\frac{m}{M}} e^{-2\pi j P(m,h,v,f,x,y,z)}$$

where:

$$R(m, f, x, y, z) =$$
$$\frac{2\alpha}{c}\sqrt{(O_x(t(m, f)) - x)^2 + (O_y(t(m, f)) - y)^2 + (O_z(t(m, f)) - z)^2}$$

$$D(m, f, x, y, z) =$$
$$\frac{2}{\lambda} \frac{O_x(t(m, f)) - x)O_{Vx} + (O_y(t(m, f)) - y)O_{Vy} + (O_z(t(m, f)) - z)O_{Vz}}{\sqrt{(O_x(t(m, f)) - x)^2 + (O_y(t(m, f)) - y)^2 + (O_z(t(m, f)) - z)^2}}$$

$$P(m, h, f, x, y, z) = \frac{\frac{O_y(t(m, f)) - y}{O_x(t(m, f)) - x}}{\sqrt{1 + \left(\frac{O_y(t(mf)) - y}{O_x(t(mf)) - x}\right)^2}} h \frac{d_h}{\lambda} +$$

$$\frac{\frac{O_z(t(mf)) - z}{\sqrt{(O_x(t(mf)) - x)^2 + (O_y(t(mf)) - y)^2}}}{\sqrt{1 + \frac{(O_z(t(mf)) - z)^2}{(O_x(t(mf)) - x)^2 + (O_y(t(mf)) - y)^2}}} v\frac{d_v}{\lambda}$$

$$t(m, f) = mT_c + fT_f$$

m—sample index
n—chirp index
h—horizontal antenna index
v—vertical antenna index
f—frame index
x—x-axis location
y—y-axis location
z—z-axis location
s—sampled signal
c—speed of light
N—number of samples
M—number of chirps
H—number of horizontal antennas
V—number of vertical antennas
F—number of frames
α—chirp slope
λ—signal wavelength
$d_h$—antenna horizontal spacing
$d_v$—antenna vertical spacing
$T_c$—Chirp repetition interval
$T_f$—Frame repetition interval
$O_x$—Odometry based vehicle position at the x-axis
$O_y$—Odometry based vehicle position at the y-axis
$O_z$—Odometry based vehicle position at the z-axis
$O_{Vx}$—Odometry based vehicle velocity at the x-axis
$O_{Vy}$—Odometry based vehicle velocity at the y-axis
$O_{Vz}$—Odometry based vehicle velocity at the z-axis The example process 200 includes generating a two-dimensional X-Y map of the area covered by the pulsed radar transmission from the SAR based on the transformed frames of data for each three-dimensional (x,y,z) point (operation 208). The two-dimensional X-Y map may be generated using conventional techniques for generating a map from radar return data.

After generation of a two-dimensional X-Y map, the vehicle may use the data from the two-dimensional X-Y map for autonomous or semi-autonomous driving features such as parking spot detection for automatic park assist. The increased resolution provided by use of SAR and the RADON-SAR transform can improve a vehicle's ability to maneuver into smaller parking spaces because the boundaries of a parking space will be known with greater detail.

Figure 3:
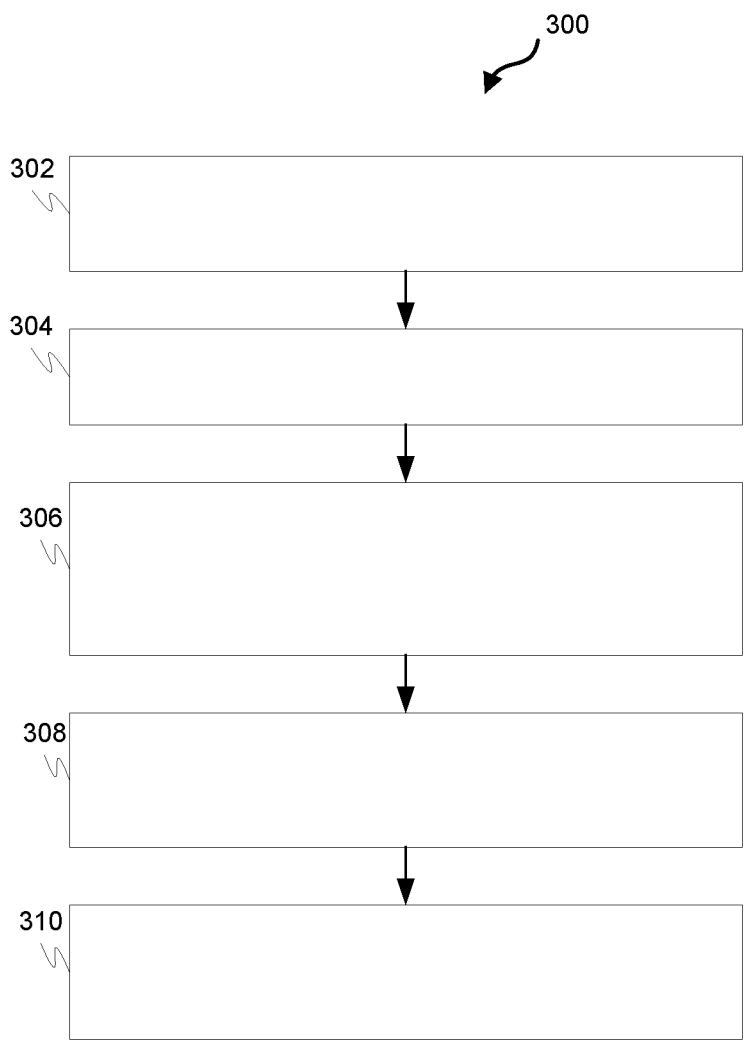
FIG. 3 is a process flow chart depicting an example process for using Synthetic Aperture Radar (SAR) to perform a maneuver in a land vehicle, in accordance with various embodiments.

FIG. 3 is a process flow chart depicting an example process 300 for using Synthetic Aperture Radar (SAR) to perform a maneuver in a land vehicle (e.g., vehicle 100). The example process 300 includes receiving digitized radar return data (e.g., from a sensor system 28 that includes one or more sensing devices 40a-40n that implements SAR) from a pulsed radar transmission from a SAR onboard the land vehicle (operation 302) and accumulating a plurality of frames of the digitized radar return data (operation 304).

The example process 300 includes applying a RADON transform (e.g., by SAR module 102 implemented by controller 34) to the accumulated plurality of frames of the digitized radar return data and odometry data from the land vehicle to generate transformed frames of data for each three-dimensional point (operation 306). The RADON transform is configured to perform coherent integration for each three-dimensional point for which a radar return exists from the pulsed radar transmission, project a radar trajectory onto each three-dimensional point, and project Doppler information onto each three-dimensional point. The example RADON-SAR transform presented above may be used as the RADON transform.

The example process 300 includes generating a two-dimensional X-Y map of an area covered by the pulsed radar transmission from the SAR based on the transformed frames of data for each three-dimensional point (operation 308) and performing an autonomous or semiautonomous maneuver with the land vehicle by applying the generated two-dimensional X-Y map (operation 310). The two-dimensional X-Y map may be generated using conventional techniques for generating a map from radar return data. The autonomous or semiautonomous maneuver may include a parking assist maneuver or some other maneuver that could benefit from highly accurate position data that can be provided from SAR.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method for using Synthetic Aperture Radar (SAR) to perform a maneuver in a land vehicle, the method comprising:

receiving digitized radar return data from a pulsed radar transmission from a Synthetic Aperture Radar (SAR) onboard a land vehicle;

accumulating a plurality of frames of the digitized radar return data;

applying a RADON transform to the accumulated plurality of frames of the digitized radar return data and odometry data from the land vehicle to generate transformed frames of data for each three-dimensional point, wherein the RADON transform is configured to perform coherent integration for each three-dimensional point for which a radar return exists from the pulsed radar transmission, project a radar trajectory onto each three-dimensional point, and project Doppler information onto each three-dimensional point;

generating a two-dimensional X-Y map of an area covered by the pulsed radar transmission from the SAR based on the transformed frames of data for each three-dimensional point; and performing an autonomous or semiautonomous maneuver with the land vehicle by applying the generated two-dimensional X-Y map.

2. The method of claim 1, wherein the RADON transform comprises a range dimension, a Doppler dimension, and a phase dimension.

3. The method of claim 2, wherein the RADON transform is represented by:

$$S(x, y, z) = \sum_{f=0}^{F-1} \sum_{v=0}^{V-1} \sum_{h=0}^{H-1} \sum_{m=0}^{M-1} \sum_{n=0}^{N-1} s(n, m, h, f)$$

$$e^{-2\pi j R(m,f,x,y,z)\frac{n}{N}} e^{-2\pi j D(m,f,x,y,z)\frac{m}{M}} e^{-2\pi j P(m,h,v,f,x,y,z)}$$

wherein: R(m,f,x,y,z) represents the range dimension, D(m,f,x,y,z) represents the Doppler dimension, P(m,h,f,x,y,z) represents the phase dimension, m=sample index, n=chirp index, h=horizontal antenna index, v=vertical antenna index, f=frame index, x=x-axis location, y=y-axis location, z=z-axis location, s=sampled signal, N=number of samples, M=number of chirps, H=number of horizontal antennas, V=number of vertical antennas, and F=number of frames.

4. The method of claim 3, wherein the range dimension of the RADON transform is represented by:

$$R(m, f, x, y, z) = \frac{2\alpha}{c}\sqrt{(O_x(t(m,f))-x)^2 + (O_y(t(m,f))-y)^2 + (O_z(t(m,f))-z)^2}$$

wherein: c=speed of light, α=chirp slope, t(m,f)=mT$_c$+fT$_f$, T$_c$=Chirp repetition interval, T$_f$=Frame repetition interval, O$_x$=Odometry based vehicle position at the x-axis, O$_y$=Odometry based vehicle position at the y-axis, and O$_z$=Odometry based vehicle position at the z-axis.

5. The method of claim 3, wherein the Doppler dimension of the RADON transform is represented by:

$$D(m, f, x, y, z) = \frac{2}{\lambda} \frac{(O_x(t(m,f))-x)O_{Vx} + (O_y(t(m,f))-y)O_{Vy} + (O_z(t(m,f))-z)O_{Vz}}{\sqrt{(O_x(t(m,f))-x)^2 + (O_y(t(m,f))-y)^2 + (O_z(t(m,f))-z)^2}}$$

wherein: t(m,f)=mT$_c$+fT$_f$, λ=signal wavelength, T$_c$=Chirp repetition interval, T$_f$=Frame repetition interval, O$_x$=Odometry based vehicle position at the x-axis, O$_y$=Odometry based vehicle position at the y-axis, O$_z$=Odometry based vehicle position at the z-axis, O$_{Vx}$=Odometry based vehicle velocity at the x-axis, O$_{Vy}$=Odometry based vehicle velocity at the y-axis, and O$_{Vz}$=Odometry based vehicle velocity at the z-axis.

6. The method of claim 3, wherein the phase dimension of the RADON transform is represented by:

$$P(m, h, f, x, y, z) = \frac{\frac{O_y(t(m,f))-y}{O_x(t(m,f))-x}}{\sqrt{1+\left(\frac{O_y(t(m,f))-y}{O_x(t(m,f))-x}\right)^2}} h\frac{d_h}{\lambda} +$$

$$\frac{\frac{O_z(t(m,f))-z}{\sqrt{(O_x(t(m,f))-x)^2 + (O_y(t(m,f))-y)^2}}}{\sqrt{1+\frac{(O_z(t(m,f))-z)^2}{(O_x(t(m,f))-x)^2 + (O_y(t(m,f))-y)^2}}} v\frac{d_v}{\lambda}$$

wherein: t(m,f)=mT$_c$+fT$_f$, λ=signal wavelength, d$_h$=antenna horizontal spacing, d$_v$=antenna vertical spacing, T$_c$=Chirp repetition interval, T$_f$=Frame repetition interval, O$_x$=Odometry based vehicle position at the x-axis, O$_y$=Odometry based vehicle position at the y-axis, O$_z$=Odometry based vehicle position at the z-axis, O$_{Vx}$=Odometry based vehicle velocity at the x-axis, O$_{Vy}$=Odometry based vehicle velocity at the y-axis, and O$_{Vz}$=Odometry based vehicle velocity at the z-axis.

7. The method of claim 1, wherein the RADON transform is represented by:

$$S(x, y, z) = \sum_{f=0}^{F-1} \sum_{v=0}^{V-1} \sum_{h=0}^{H-1} \sum_{m=0}^{M-1} \sum_{n=0}^{N-1} s(n, m, h, f)$$

$$e^{-2\pi j R(m,f,x,y,z)\frac{n}{N}} e^{-2\pi j D(m,f,x,y,z)\frac{m}{M}} e^{-2\pi j P(m,h,v,f,x,y,z)}$$

wherein:

$$R(m, f, x, y, z) = \frac{2\alpha}{c}\sqrt{(O_x(t(m,f))-x)^2 + (O_y(t(m,f))-y)^2 + (O_z(t(m,f))-z)^2}$$

$$D(m, f, x, y, z) = \frac{2}{\lambda} \frac{(O_x(t(m,f))-x)O_{Vx} + (O_y(t(m,f))-y)O_{Vy} + (O_z(t(m,f))-z)O_{Vz}}{\sqrt{(O_x(t(m,f))-x)^2 + (O_y(t(m,f))-y)^2 + (O_z(t(m,f))-z)^2}}$$

$$P(m, h, f, x, y, z) = \frac{\frac{O_y(t(m,f))-y}{O_x(t(m,f))-x}}{\sqrt{1+\left(\frac{O_y(t(m,f))-y}{O_x(t(m,f))-x}\right)^2}} h\frac{d_h}{\lambda} +$$

$$\sqrt{1+\frac{(O_z(t(m,f))-z)^2}{(O_x(t(m,f))-x)^2 + (O_y(t(m,f))-y)^2}}$$

-continued $$\sqrt{1 + \frac{(O_z(t(m,f)) - z)^2}{(O_x(t(m,f)) - x)^2 + (O_y(t(m,f)) - y)^2}} \frac{O_z(t(m,f)) - z}{\sqrt{(O_x(t(m,f)) - x)^2 + (O_y(t(m,f)) - y)^2}} v \frac{d_v}{\lambda}$$

$$t(m, f) = mT_c + fT_f$$

m=sample index, n=chirp index, h=horizontal antenna index, v=vertical antenna index, f=frame index, x=x-axis location, y=y-axis location, z=z-axis location, s=sampled signal, N=number of samples, M=number of chirps, H=number of horizontal antennas, V=number of vertical antennas, F=number of frames, c=speed of light, α=chirp slope, λ=signal wavelength, $d_h$=antenna horizontal spacing, $d_v$=antenna vertical spacing, $T_c$=Chirp repetition interval, $T_f$=Frame repetition interval, $O_x$=Odometry based vehicle position at the x-axis, $O_y$=Odometry based vehicle position at the y-axis, $O_z$=Odometry based vehicle position at the z-axis, $O_{Vx}$=Odometry based vehicle velocity at the x-axis, $O_{Vy}$=Odometry based vehicle velocity at the y-axis, and $O_{Vz}$=Odometry based vehicle velocity at the z-axis.

8. A system for applying Synthetic Aperture Radar (SAR) in a land vehicle to perform a maneuver, the system comprising a controller configured to:
 receive digitized radar return data from a pulsed radar transmission from a Synthetic Aperture Radar (SAR) onboard a land vehicle;
 accumulate a plurality of frames of the digitized radar return data;
 apply a RADON transform to the accumulated plurality of frames of the digitized radar return data and odometry data from the land vehicle to generate transformed frames of data for each three-dimensional point, wherein the RADON transform is configured to perform coherent integration for each three-dimensional point for which a radar return exists from the pulsed radar transmission, project a radar trajectory onto each three-dimensional point, and project Doppler information onto each three-dimensional point;
 generate a two-dimensional X-Y map of an area covered by the pulsed radar transmission from the SAR based on the transformed frames of data for each three-dimensional point; and
 perform an autonomous or semiautonomous maneuver with the land vehicle by applying the generated two-dimensional X-Y map.

9. The system of claim 8, wherein the RADON transform comprises a range dimension, a Doppler dimension, and a phase dimension.

10. The system of claim 9, wherein the RADON transform is represented by:

$$S(x, y, z) = \sum_{f=0}^{F-1} \sum_{v=0}^{V-1} \sum_{h=0}^{H-1} \sum_{m=0}^{M-1} \sum_{n=0}^{N-1} s(n, m, h, f)$$

$$e^{-2\pi j R(m,f,x,y,z) \frac{n}{N}} e^{-2\pi j D(m,f,x,y,z) \frac{m}{M}} e^{-2\pi j P(m,h,v,f,x,y,z)}$$

wherein: R(m,f,x,y,z) represents the range dimension, D(m,f,x,y,z) represents the Doppler dimension, P(m,h,f,x,y,z) represents the phase dimension, m=sample index, n=chirp index, h=horizontal antenna index, v=vertical antenna index, f=frame index, x=x-axis location, y=y-axis location, z=z-axis location, s=sampled signal, N=number of samples, M=number of chirps, H=number of horizontal antennas, V=number of vertical antennas, and F=number of frames.

11. The system of claim 10, wherein the range dimension of the RADON transform is represented by:

$$R(m, f, x, y, z) = \frac{2\alpha}{c} \sqrt{(O_x(t(m,f)) - x)^2 + (O_y(t(m,f)) - y)^2 + (O_z(t(m,f)) - z)^2}$$

wherein: c=speed of light, α=chirp slope, $t(m,f)=mT_c+fT_f$, $T_c$=Chirp repetition interval, $T_f$=Frame repetition interval, $O_x$=Odometry based vehicle position at the x-axis, $O_y$=Odometry based vehicle position at the y-axis, and $O_z$=Odometry based vehicle position at the z-axis.

12. The system of claim 10, wherein the Doppler dimension of the RADON transform is represented by:

$$D(m, f, x, y, z) = \frac{2}{\lambda} \frac{O_x(t(m,f)) - x)O_{Vx} + (O_y(t(m,f)) - y)O_{Vy} + (O_z(t(m,f)) - z)O_{Vz}}{\sqrt{(O_x(t(m,f)) - x)^2 + (O_y(t(m,f)) - y)^2 + (O_z(t(m,f)) - z)^2}}$$

wherein: $t(m,f)=mT_c+fT_f$, λ=signal wavelength, $T_c$=Chirp repetition interval, $T_f$=Frame repetition interval, $O_x$=Odometry based vehicle position at the x-axis, $O_y$=Odometry based vehicle position at the y-axis, $O_z$=Odometry based vehicle position at the z-axis, $O_{Vx}$=Odometry based vehicle velocity at the x-axis, $O_{Vy}$=Odometry based vehicle velocity at the y-axis, and $O_{Vz}$=Odometry based vehicle velocity at the z-axis.

13. The system of claim 10, wherein the phase dimension of the RADON transform is represented by:

$$P(m, h, f, x, y, z) = \frac{\frac{O_y(t(m,f)) - y}{O_x(t(m,f)) - x}}{\sqrt{1 + \left(\frac{O_y(t(m,f)) - y}{O_x(t(m,f)) - x}\right)^2} \sqrt{1 + \frac{(O_z(t(m,f)) - z)^2}{(O_x(t(m,f)) - x)^2 + (O_y(t(m,f)) - y)^2}}} h \frac{d_h}{\lambda} +$$

$$\frac{\frac{O_z(t(m,f)) - z}{\sqrt{(O_x(t(m,f)) - x)^2 + (O_y(t(m,f)) - y)^2}}}{\sqrt{1 + \frac{(O_z(t(m,f)) - z)^2}{(O_x(t(m,f)) - x)^2 + (O_y(t(m,f)) - y)^2}}} v \frac{d_v}{\lambda}$$

wherein: $t(m,f)=mT_c+fT_f$, λ=signal wavelength, $d_h$=antenna horizontal spacing, $d_v$=antenna vertical spacing, $T_c$=Chirp repetition interval, $T_f$=Frame repetition interval, $O_x$=Odometry based vehicle position at the x-axis, $O_y$=Odometry based vehicle position at the y-axis, $O_z$=Odometry based vehicle position at the z-axis, $O_{Vx}$=Odometry based vehicle velocity at the x-axis, $O_{Vy}$=Odometry based vehicle velocity at the y-axis, and $O_{Vz}$=Odometry based vehicle velocity at the z-axis.

14. The system of claim 8, wherein the RADON transform is represented by:

$$S(x, y, z) = \sum_{f=0}^{F-1}\sum_{v=0}^{V-1}\sum_{h=0}^{H-1}\sum_{m=0}^{M-1}\sum_{n=0}^{N-1} s(n, m, h, f)$$

$$e^{-2\pi j R(m,f,x,y,z)\frac{n}{N}} e^{-2\pi j D(m,f,x,y,z)\frac{m}{M}} e^{-2\pi j P(m,h,v,f,x,y,z)}$$

wherein:

$R(m, f, x, y, z) =$ $$\frac{2\alpha}{c}\sqrt{(O_x(t(m, f)) - x)^2 + (O_y(t(m, f)) - y)^2 + (O_z(t(m, f)) - z)^2}$$

$D(m, f, x, y, z) =$ $$\frac{2}{\lambda}\frac{(O_x(t(m, f)) - x)O_{V_x} + (O_y(t(m, f)) - y)O_{V_y} + (O_z(t(m, f)) - z)O_{V_z}}{\sqrt{(O_x(t(m, f)) - x)^2 + (O_y(t(m, f)) - y)^2 + (O_z(t(m, f)) - z)^2}}$$

$$P(m, h, f, x, y, z) = \frac{\frac{O_y(t(m, f)) - y}{O_x(t(m, f)) - x}}{\sqrt{1 + \left(\frac{O_y(t(m, f)) - y}{O_x(t(m, f)) - x}\right)^2}} h\frac{d_h}{\lambda} +$$

$$\frac{\frac{O_z(t(m, f)) - z}{\sqrt{(O_x(t(m, f)) - x)^2 + (O_y(t(m, f)) - y)^2}}}{\sqrt{1 + \frac{(O_z(t(m, f)) - z)^2}{(O_x(t(m, f)) - x)^2 + (O_y(t(m, f)) - y)^2}}} v\frac{d_v}{\lambda}$$

$$t(m, f) = mT_c + fT_f$$

m=sample index, n=chirp index, h=horizontal antenna index, v=vertical antenna index, f=frame index, x=x-axis location, y=y-axis location, z=z-axis location, s=sampled signal, N=number of samples, M=number of chirps, H=number of horizontal antennas, V=number of vertical antennas, F=number of frames, c=speed of light, $\alpha$=chirp slope, $\lambda$=signal wavelength, $d_h$=antenna horizontal spacing, $d_v$=antenna vertical spacing, $T_c$=Chirp repetition interval, $T_f$=Frame repetition interval, $O_x$=Odometry based vehicle position at the x-axis, $O_y$=Odometry based vehicle position at the y-axis, $O_z$=Odometry based vehicle position at the z-axis, $O_{V_x}$=Odometry based vehicle velocity at the x-axis, $O_{V_y}$=Odometry based vehicle velocity at the y-axis, and $O_{V_z}$=Odometry based vehicle velocity at the z-axis.

15. A non-transitory computer readable medium encoded with programming instructions causing a processor in a land vehicle to perform a method for using Synthetic Aperture Radar (SAR) to perform a maneuver with the land vehicle, the method comprising:

accumulating a plurality of frames of digitized radar return data;

applying a RADON transform to the accumulated plurality of frames of the digitized radar return data and odometry data from the land vehicle to generate transformed frames of data for each three-dimensional point, wherein the RADON transform is configured to perform coherent integration for each three-dimensional point for which a radar return exists from the pulsed radar transmission, project a radar trajectory onto each three-dimensional point, and project Doppler information onto each three-dimensional point; generating a two-dimensional X-Y map of an area covered by the pulsed radar transmission from the SAR based on the transformed frames of data for each three-dimensional point; and performing an autonomous or semiautonomous maneuver with the land vehicle by applying the generated two-dimensional X-Y map.

16. The non-transitory computer readable medium of claim 15, wherein the RADON transform comprises a range dimension, a Doppler dimension, and a phase dimension.

17. The non-transitory computer readable medium of claim 16, wherein the RADON transform is represented by:

$$S(x, y, z) = \sum_{f=0}^{F-1}\sum_{v=0}^{V-1}\sum_{h=0}^{H-1}\sum_{m=0}^{M-1}\sum_{n=0}^{N-1} s(n, m, h, f)$$

$$e^{-2\pi j R(m,f,x,y,z)\frac{n}{N}} e^{-2\pi j D(m,f,x,y,z)\frac{m}{M}} e^{-2\pi j P(m,h,v,f,x,y,z)}$$

wherein: R(m,f,x,y,z) represents the range dimension, D(m,f,x,y,z) represents the Doppler dimension, P(m,h,f,x,y,z) represents the phase dimension, m=sample index, n=chirp index, h=horizontal antenna index, v=vertical antenna index, f=frame index, x=x-axis location, y=y-axis location, z=z-axis location, s=sampled signal, N=number of samples, M=number of chirps, H=number of horizontal antennas, V=number of vertical antennas, and F=number of frames.

18. The non-transitory computer readable medium of claim 17, wherein the range dimension of the RADON transform is represented by:

$R(m, f, x, y, z) =$ $$\frac{2\alpha}{c}\sqrt{(O_x(t(m, f)) - x)^2 + (O_y(t(m, f)) - y)^2 + (O_z(t(m, f)) - z)^2}$$

wherein: c=speed of light, $\alpha$=chirp slope, t(m,f)=$mT_c+fT_f$, $T_c$=Chirp repetition interval, $T_f$=Frame repetition interval, $O_x$=Odometry based vehicle position at the x-axis, $O_y$=Odometry based vehicle position at the y-axis, and $O_z$=Odometry based vehicle position at the z-axis.

19. The non-transitory computer readable medium of claim 17, wherein the Doppler dimension of the RADON transform is represented by:

$D(m, f, x, y, z) =$ $$\frac{2}{\lambda}\frac{O_x(t(m, f)) - x)O_{V_x} + (O_y(t(m, f)) - y)O_{V_y} + (O_z(t(m, f)) - z)O_{V_z}}{\sqrt{(O_x(t(m, f)) - x)^2 + (O_y(t(m, f)) - y)^2 + (O_z(t(m, f)) - z)^2}}$$

wherein: t(m,f)=$mT_c+fT_f$, $\lambda$=signal wavelength, $T_c$=Chirp repetition interval, $T_f$=Frame repetition interval, $O_x$=Odometry based vehicle position at the x-axis, $O_y$=Odometry based vehicle position at the y-axis, $O_z$=Odometry based vehicle position at the z-axis, $O_{V_x}$=Odometry based vehicle velocity at the x-axis, $O_{V_y}$=Odometry based vehicle velocity at the y-axis, and $O_{V_z}$=Odometry based vehicle velocity at the z-axis.

20. The non-transitory computer readable medium of claim 17, wherein the phase dimension of the RADON transform is represented by:

$$P(m, h, f, x, y, z) = \frac{\dfrac{O_y(t(m,f)) - y}{O_x(t(m,f)) - x}}{\sqrt{1 + \left(\dfrac{O_y(t(m,f)) - y}{O_x(t(m,f)) - x}\right)^2}} h \frac{d_h}{\lambda} +$$

$$\sqrt{1 + \dfrac{(O_z(t(m,f)) - z)^2}{(O_x(t(m,f)) - x)^2 + (O_y(t(m,f)) - y)^2}}$$

$$\dfrac{\dfrac{O_z(t(m,f)) - z}{\sqrt{(O_x(t(m,f)) - x)^2 + (O_y(t(m,f)) - y)^2}}}{\sqrt{1 + \dfrac{(O_z(t(m,f)) - z)^2}{(O_x(t(m,f)) - x)^2 + (O_y(t(m,f)) - y)^2}}} v \dfrac{d_v}{\lambda}$$

wherein: $t(m,f) = mT_c + fT_f$, $\lambda$=signal wavelength, $d_h$=antenna horizontal spacing, $d_v$=antenna vertical spacing, $T_c$=Chirp repetition interval, $T_f$=Frame repetition interval, $O_x$=Odometry based vehicle position at the x-axis, $O_y$=Odometry based vehicle position at the y-axis, $O_z$=Odometry based vehicle position at the z-axis, $O_{Vx}$=Odometry based vehicle velocity at the x-axis, $O_{Vy}$=Odometry based vehicle velocity at the y-axis, and $O_{Vz}$=Odometry based vehicle velocity at the z-axis.

* * * * *